Jan. 15, 1963 C. V. TILDEN 3,073,909

PHONE DIAL AID ACCESSORY

Filed Dec. 6, 1957 2 Sheets-Sheet 1

INVENTOR.
CARL V. TILDEN

BY

ATTORNEY

Jan. 15, 1963 C. V. TILDEN 3,073,909

PHONE DIAL AID ACCESSORY

Filed Dec. 6, 1957 2 Sheets-Sheet 2

INVENTOR.
CARL V. TILDEN

BY W. T. Allen
ATTORNEY

United States Patent Office 3,073,909
Patented Jan. 15, 1963

3,073,909
PHONE DIAL AID ACCESSORY
Carl V. Tilden, 26315 Via Canon,
Capistrano Beach, Calif.
Filed Dec. 6, 1957, Ser. No. 701,235
18 Claims. (Cl. 179—90)

This invention relates to telephone dialing mechanisms and more particularly to a compact semi-antomatic accessory adapted to be supported in close proximity to the dialing ring of a phone set and being operable along with the phone dial to advance phone dialing instructions into view sequentially during each dialing operation.

Virtually all major urban areas are now equipped with operator-actuated dialing systems and function to control switching mechanism at the central station as required to complete a connection to the party desired. Such machine switching, the action of which is under the complete control of each phone user, makes use of a rotary dial on the phone set having ten finger openings into any one of which the finger can be inserted to rotate the dial clockwise in opposition to a spring and against a finger stop. The rotation of the dial through an arc of predetermined length is utilized to transmit a series of signal impulses to the central switching station as determined by the length of the arcuate dialing movement. The ultimate line connection to which the switch gear is adjusted by such signal impulses is dependent upon the accuracy of the individual dialing operations. Each of the ten finger openings in the dial is utilized to represent a separate digit from one to zero as well as three different letters of the alphabet. Accordingly, one digit and three letters must be cramped into a display area associated with each of the ten finger holes and yet formed in a size and shape rendering them readily readable at a distance.

Additionally and of particular importance, the user must remember accurately a series of letters and numbers comprising the phone number of the party he wishes to call. Usually this number is formed by a minimum of five characters including one letter and four numerals or digits. However, in more populated areas the minimum characters or symbols required to be dialed includes two letters, a digit for the particular exchange and four digits representing the party number in that exchange, or a total of seven symbols.

Moreover, to make a call into or between larger metropolitan areas, it is now necessary to dial an even larger number of symbols to effect the required switching from area to area. Usually such area switching operations require the dialing of a minimum of three symbols. Accordingly, it is today a commonplace necessity for a phone subscriber to use thirteen separate operations in a predetermined sequence and with complete accuracy in order to complete connections to the party desired.

In recognition of this problem, there have been previous proposals for devices intended to assist the user in the use of the mechanism forming part of the individual phone set. Many of these have dealt with devices providing a better or a larger view of the symbols associated with the dialing ring. Other devices have attempted to supplant the symbols provided by the utility company with a substitute symbol arrangement considered superior to the original equipment. However, all such prior devices have left much to be desired and have been subject to various shortcomings and disadvantages which it is the object of this invention to obviate.

For example, the present invention provides a compact, self-contained dialing aid accessory adapted to be supported in close proximity to the phone set dial ring. A readily separable symbol carrier disc is provided for each party the subscriber has occasion to phone. This carrier is normally detached and filed in a convenient file index until needed to complete a call to that party. The disc is then removed from the file and inserted in the dialing accessory in a predetermined position. When so installed, a symbol representative of the first dialing operation is exposed to view, preferably in magnified form, while the other symbols are out of registry with the viewing area. In dialing the particular symbol thus presented, the user unknowingly automatically indexes the next symbol to be dialed into viewing position. As the dial is turning to its starting position, the user reads this next symbol and immediately dials the position indicated thereby. In this manner, the entire series of symbols are dialed in sequence without need for visually separating one symbol from any other or without liability of error due to the accidental reading of any symbol out of sequence.

The accessory of this invention is adapted to be mounted on the phone set in a manner offering neither physical nor visual obstruction to the free use of the dial ring equipment in the normal and customary manner. Hence, the presence of the accessory on the phone set does not interfere in any way with the normal use of the dial equipment utilizing the symbol designators associated with each finger hole of the dial ring. For this reason, the phone set may be used as formerly when dialing numbers well known and frequently used by the subscriber, or when dialing local parties whose numbers have been memorized. However, when a party is desired whose number is of a more complex nature, resort may be had to the dial aid accessory of this invention simply by inserting the carrier card for the party being called in the accessory and dialing from instructions indexed to view following the procedure outlined above. Once the connection has been made, the carrier for that party is removed and refiled in the card index.

Accordingly, it is a primary object of this invention to provide an improved dial aid accessory having various advantages and features not heretofore proposed.

Another object of the invention is the provision of a dial aid accessory which is compact and a self-contained assembly adapted to be quickly and easily attached to conventional phone sets without need for alterations therein and without interference with the use of the usual dial equipment in a conventional manner and yet which is instantly available to assist the subscriber in completing a call expeditiously and efficiently.

Another object of the invention is the provision of a dial aid accessory for association with telephone dialing rings and making use of a symbol carrier wherein the symbols required to be dialed are automatically and sequentially brought into viewing position as an incident to the dialing of a previous symbol.

Another object of the invention is the provision of a semi-automatic dialing accessory adapted to have the particular number of the party to be called inserted therein and mechanically indexed as an incident to the manual operation of the dial ring.

Another object of the invention is the provision of a simple symbol carrier for each party to be dialed and which is adapted to be quickly assembled within the dialing accessory in readiness for dialing and which can thereafter be detached and compactly filed for future use as and when needed.

Another object of the invention is the provision of a dial aid accessory adapted to be quickly and easily clamped to a phone set in such manner that either the conventional phone dial or the dialing accessory can be used selectively in dialing and without need for first making any adjustments or resorting to conditioning manipulations before using the dial.

These and other more specific objects will appear upon reading the following specification and claims and upon considering in connection therewith the attached drawings to which they relate.

Referring now to the drawings in which a preferred embodiment of the invention is illustrated:

Figure 1:
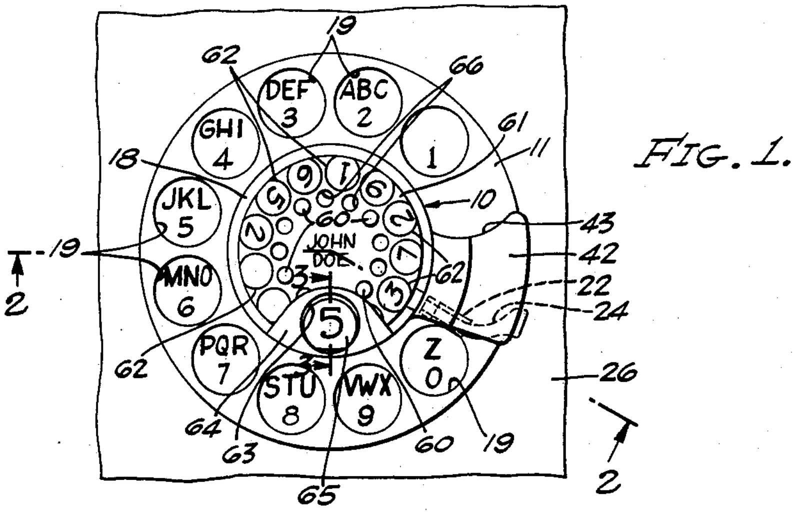
FIGURE 1 is a top plan view of the accessory incorporating the present invention shown installed in the center of a conventional phone set dial ring.

Referring to FIGURES 1 to 4, there is shown a dial aid accessory designated generally 10 adapted to be rigidly secured centrally to the top face of a conventional dial ring 11 of a phone set. The dialing accessory as here shown comprises an inverted cup-shaped mounting base 12 having a narrow radial encircling lip 13 beveled on one side and adapted to be pressed beneath the inwardly curled assembly flange 14 of the dial ring assembly. Lip 14 is commonly employed to hold detachably in place a card 15 on which is imprinted the subscriber's own phone number and which may be left in place. It will be understood that base ring 12 and its side wall 16 are preferably formed of a suitable resilient plastic which can be compressed inwardly to the slight extent necessary to engage the beveled retaining lip 13 beneath the curled lip 14 of the dial ring. Accordingly, it will be recognized that mounting base 12 is rigidly fixed to the dial and rotates therewith.

The main body proper of accessory 10 includes an outer ring-like housing 18 having a radius slightly less than the radial distance to the inner edge of finger holes 19 in dial ring 11, as is best shown in FIGURE 1. Since the accessory is of low height and of the described diameter, it does not obstruct the full view of the finger openings nor of the dialing direction symbols displayed on a ring supported therebelow. Nor does the presence of the accessory on the phone dial interfere with the insertion of the fingers in finger holes 19 and the use of the dial in the customary manner.

The lower peripheral edge of housing ring 18 has a snap press fit over the peripheral rim edge 20 of a base or stationary ring 21 having an anchoring arm 22 projecting laterally from one edge. The lower end of arm 22 has a radial channel 23 contoured to frictionally engage over and grip the inner end and sides of the usual finger stop 24. This stop is of generally L-shaped configuration with its shorter vertical leg 25 projecting downwardly opposite the four o'clock position of the dial to a point of anchorage beneath the dial and on the phone set base 26. It will be understood that due to the described anchorage of arm 22 over the inner end of finger stop 24 disc 21 and housing ring 18 are held stationary at all times despite the rotation of dial ring 11 about its own axis and of supporting base 12 of the dial accessory.

The means for holding housing 18 and anchor ring 21 centered above supporting base 12 comprises a shallow inverted cup-shaped disc 28 having a hollow stem 29 projecting downwardly from its center through an opening 30 in anchor ring 21 in which it is journaled. Suitably secured in stem 29, as by adhesive or otherwise, is an assembly retainer stud 31 provided with a radial flange 32 having one face lying flush across the end of stem 29 and the adjacent rim edge of hole 30. It will be understood that a principal function of flange 32 is to hold disc member 28 rotatably assembled to anchor plate 21. The spherically shaped lower end 33 of stud 31 is formed of a suitable resilient plastic and has a normal diameter in excess of central opening 34 in mounting member 12. It will therefore be apparent that ball 33 and opening 34 are so dimensioned and formed that ball 33 can be firmly pressed downwardly through opening 34 to a position wherein its horizontal diameter lies slightly below the lower rim edge of passage 34. It is pointed out that the resilient plastic will distort sufficiently to permit this assembly after which the ball expands to lock the parts detachably assembled without need for fastening devices or the use of tools.

An important feature of the invention is the provision of means for indexing the carrier card supporting disc 28 through an arc of predetermined length each time dial 11 is operated to initiate a switching signal to the central station. The referred to indexing mechanism comprises an indexing disc 36, shown in perspective in FIGURE 4, having a diameter slightly less than the internal diameter of housing 18. An opening 37 centrally of the disc is journaled about stem 29 of disc 28 and provides a pivot about which the disc can be pivoted to advance disc 28 by increments of desired length, the limits of the arcuate movement being limited by an arcuate slot 38 and a cooperating stud 39 projecting upwardly from anchor ring 21, as is best shown in FIGURES 5 and 6. If the largest number of symbols to be dialed in making a connection is thirteen, then the arcuate length of slot 38 will be roughly equivalent to 1/13 of a full circle. Projecting radially from the rim edge of indexing ring 36 and through a slot 41 in housing ring 18 is an indexing arm 42. The upper edge 43 of this arm is of generally arcuate shape and is so positioned relative to the forward edge of finger stop 24 that the index disc will be advanced a full increment by engagement of the user's finger therewith as the finger is held in an opening of dial 11 and rotated to its normal stop position against stop 24 in dialing. Stated differently, the arcuate distance between upper edge 43 of the indexing arm 42 with respect to stop 24 is such that the index ring will be advanced through a desired increment of rotation equal to the spacing between symbols of the symbol carrier ring each time the phone dial is actuated.

Figure 4:
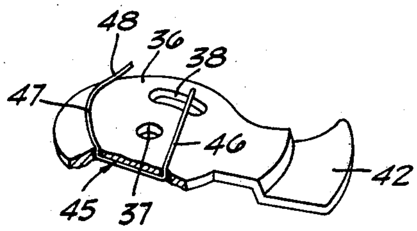
FIGURE 4 is a perspective view of the indexing actuator with a portion broken away.
Figures 5, 6, 7:
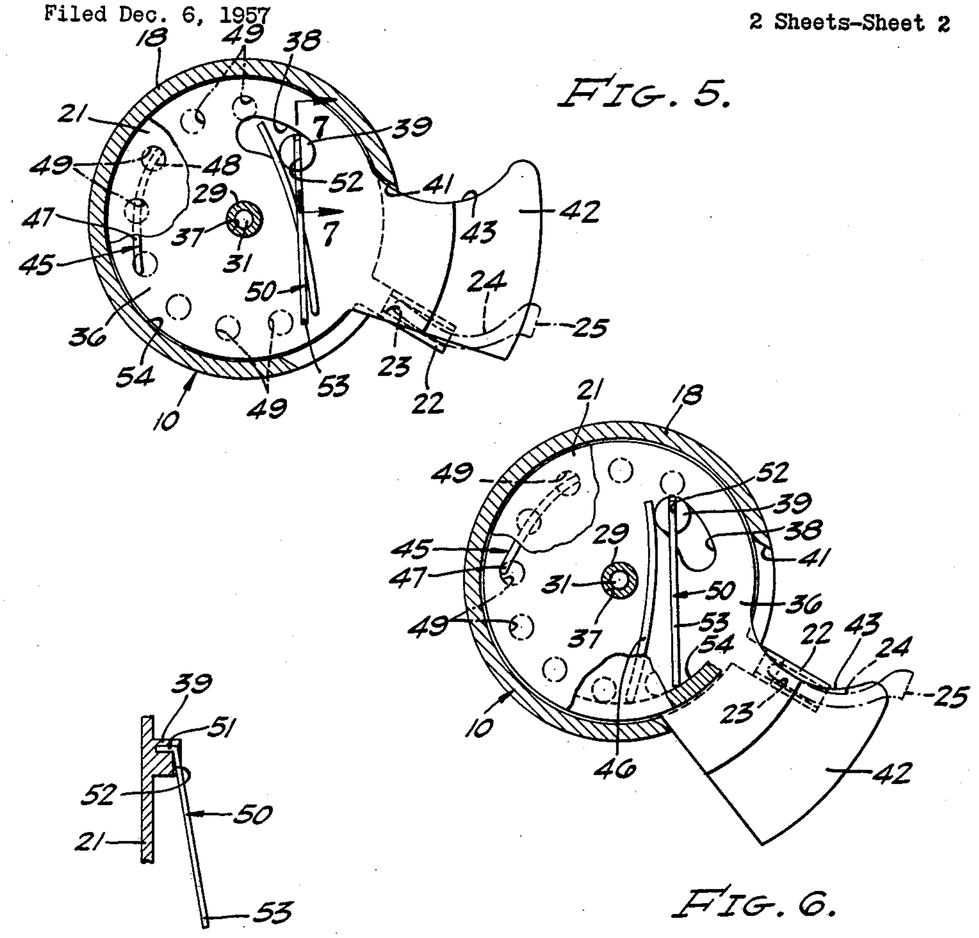
FIGURE 5 is a transverse sectional view taken along line 5—5 on FIGURE 2 showing the normal position of the parts.
FIGURE 6 is a view similar to FIGURE 5 but showing the position of parts with the indexing arm in its extreme actuated position.
FIGURE 7 is a fragmentary detailed view of the brake mechanism.

Movement of the indexing ring is resisted by a generally U-shaped spring best shown in FIGURE 4 and designated generally 45. The bight portion of this spring is located on the underside of the indexing disc and its legs extend upwardly through openings therein with one leg 46 extending across the upper face of disc 28 and bearing against post 39 of anchor plate 21. In consequence, it will be clear that resilient leg 46 cooperates with stationary post 39 in urging the indexing ring to rotate counterclockwise against the stop provided by the upper end of notch 41 in housing 18. The other leg 47 of spring 45 has an upturned end 48 which is adapted to project into and seat against the wall of one of 13 shallow recesses 49 arranged in a circle in the interior bottom of disc 28, it being understood that there is one recess for each indexed position of the indexing device.

Retrograde action of disc 28 in a clockwise direction is positively safeguarded against both by spring leg 47, 48 as well as by a one-way clutch and brake device consisting of a generally L-shaped spring 50 best shown in FIGURES 5 to 7. The shorter leg 51 of this spring is anchored in a receiving hole opening downwardly into post 39 from the bottom of a transverse groove 52 across the end of this post. Groove 52 receives the body of spring 50 with a press fit as does the opening for leg 51. When the parts are partially disassembled, the position of spring 50 relative to anchor plate 21 is that shown in FIGURE 7. When assembled, the free end 53 of spring 50 bears resiliently against the inner side of side wall 54 of disc 28 in such position as to permit disc 28 to rotate clockwise as viewed in FIGURES 1, 5 and 6. However, should there be any tendency for disc 28 to rotate counterclockwise, the sharp end 53 of the spring brake digs into the plastic material of which the ring is preferably composed, thereby positively preventing such movement. By the same token, the end 48 of spring 47 seated as it is in one of the depressions 49 of disc 28 provides further braking and locking action against counterclockwise rotation of disc 28. Springs 47 and 48 are primarily effective in locking the disc against movement when the device is stationary, whereas springs 50 and 53 are effective in preventing retrograde movement at all times.

Figure 2:
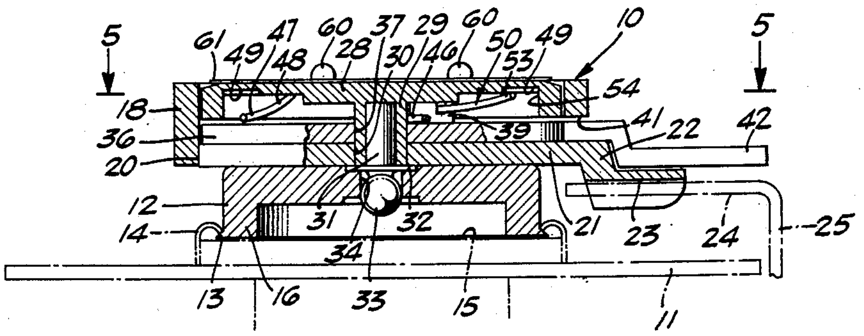
FIGURE 2 is a transverse sectional view taken along line 2—2 of FIGURE 1.
Figure 3:
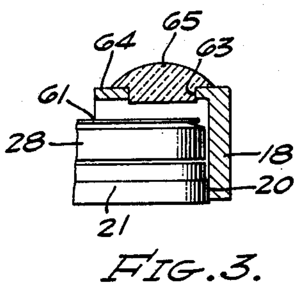
FIGURE 3 is a fragmentary sectional view on an enlarged scale taken on line 3—3 of FIGURE 1.

Referring now more particularly to FIGURES 1, 2 and 3, it will be seen that the upper exposed surface of disc 28 is provided with a plurality of locator posts 60, 60 having rounded exposed ends, there being four such posts in the device illustrated. However, it will be understood that there may be a lesser or a greater number, at least two being desirable to assure proper location and retention of the detachable symbol carrier 61. The latter consists of a thin sheet of flexible material, paper, plastic or the like being suitable, adapted to have appropriate dialing symbols printed thereon. As herein shown, carrier 61 is circular and preferably has a diameter as large as is conveniently possible without obstructing a clear view of the letters and numbers of the usual phone dial mechanism viewable through finger openings 19. Arranged about the rim of carrier 61 are thirteen segments or circled areas having suitable symbols imprinted thereon such as letters or the numbers shown within circles 62 of FIGURE 1. These are arranged to be indexed sequentially into viewing position beneath viewing window 63 formed in a shelf 64 (FIGURE 3) integral with housing ring 18. To increase the readability of the symbols in areas 62, window 63 is preferably provided with a magnifying lens 65 effective to increase the apparent size of the dialing symbols.

Another important feature of carrier disc 16 is the provision of suitable locators openings 66, there being one such locator opening for each increment of advance of the indexing device. Openings 66 are arranged to register with locator posts 60. In consequence, it is a simple matter to assemble carrier disc 61 over the locator posts with any preselected dialing instruction area 62 properly positioned beneath the viewing station or window 63. For this reason, it is immaterial what position disc 28 may be in when the carrier disc is inserted into dialing accessory 10. Regardless of the position of disc 28, the carrier for a party to be called is always inserted over posts 60 in such position that the first dialing instruction is located beneath window 63. As shown in FIGURE 1, the symbol so assembled and visible through the window is the digit 5. Accordingly, the operator knows that the first finger opening to be dialed is the number 5 or the one just above the nine o'clock position of the dial as illustrated in FIGURE 1 and through which the numeral 5 is visible. As an aid in the expeditious and accurate assembly of a carrier disc into the accessory, it is desirable that the first symbol of a number to be dialed have a distinctive appearance. Such distinctive appearance may be provided in numerous ways such as by a distinctive color for the first symbol, a distinctive color for the background for the first symbol or the like.

To place the device in operation, it is usually desirable to detach the housing proper from base 12. This is done by applying pressure against the underside of retainer ball 33 and pressing the same outwardly through opening 34.

Base 12 is then pressed downwardly centrally of the dial, one rim edge being pressed beneath curled lip 14 after which pressure is applied against the opposite side of the base to press the other side of retainer lip 13 inwardly and beneath lip 14. Once this is accomplished, the base is rigidly anchored to the dial and rotates therewith. The housing proper containing the remainder of the accessory unit is then secured in place by pressing ball 33 downwardly through opening 34, care being first taken to align the downwardly opening radial groove 23 in anchor arm 22 with the finger stop 24. Pressure is then applied to the top of the device to deform resilient ball 33 to the extent necessary to press it into opening 34.

It remains to install a carrier disc 61 over locator posts 60 after the proper dialing instructions have been applied to instruction areas 62 of the carrier. The simplest and a preferred type of instruction consists simply of numerals arranged in the order in which the respective finger holes of dial 11 are required to be rotated in sequence to complete the connections to the party being called. Let it be assumed that the subscriber is located outside the city of Chicago and that the number of the party to be called is Randolph 9–1652. Let it further be assumed that the code designator for making a connection with the appropriate Chicago switchboard is 503. In these circumstances, the areas 62 along the rim of carrier disc 61 would have imprinted thereon the symbols or numerals 503–72–9–1652 in that order counterclockwise of the disc. Carrier disc 61 with these numerals imprinted thereon is then assembled over posts 60, care being taken to locate the first numeral 5 beneath viewing window 63.

To dial the party, the subscriber first dials the numeral 5 placing his finger in the finger opening overlying this digit on the dialing mechanism and rotating dial 11 clockwise until his finger contacts stop 24. As the dial is rotated clockwise, the finger will engage edge 43 of indexing arm 42 thereby rotating this arm clockwise about the pivot provided by stem 29. As indexing disc 36 is rotated clockwise, it will carry end 48 of spring 47 along with it and rotate disc 28 to which carrier 61 is attached, a distance sufficient to index the next dialing symbol "0" beneath window 63. As disc 36 is so rotated post 39 will remain stationary causing spring arm 46 resting thereagainst to be stretched. By the time the index ring has been rotated a full increment, post 39 will be at the left-hand end of slot 38 as viewed in FIGURE 4 and spring 46 will be fully stressed. Accordingly, as soon as the operator removes his finger from the dial the energy stored in the spring will be effective to return the indexing disc counterclockwise as spring 48 moves out of one of the recesses 49 and into the next recess 49 in a counterclockwise direction. Should there be any tendency for disc 28 to move during this portion of the operation, end 53 of spring 50 will engage the downturned rim of disc 28 and positively prevent such movement. The user continues to dial the remaining numerals as each is automatically presented beneath viewing window 63 until all digits of the number have been dialed, thereby completing the connection to his party. After the call has been completed, carrier disc 61 is lifted from posts 60 and returned to an appropriate file until next needed.

If the user desires to use the dialing system in the usual manner and without need of the described accessory device, he may do so, making use of the letters and numerals visible through the finger holes of the dial. As the dial is rotated, the indexing arm 42 will be rotated and will act through the indexing mechanism to rotate disc 28. However, this is an incidental matter having no effect whatever on the use of the dial and will in all probability go unnoticed by the user. Owing to the compact nature of the dialing accessory and its location centrally of the dial, it does not interfere with the use of the fingers in dialing or with the use of a special dialing implement which is preferred by some users in operating dial 11.

Figure 8:
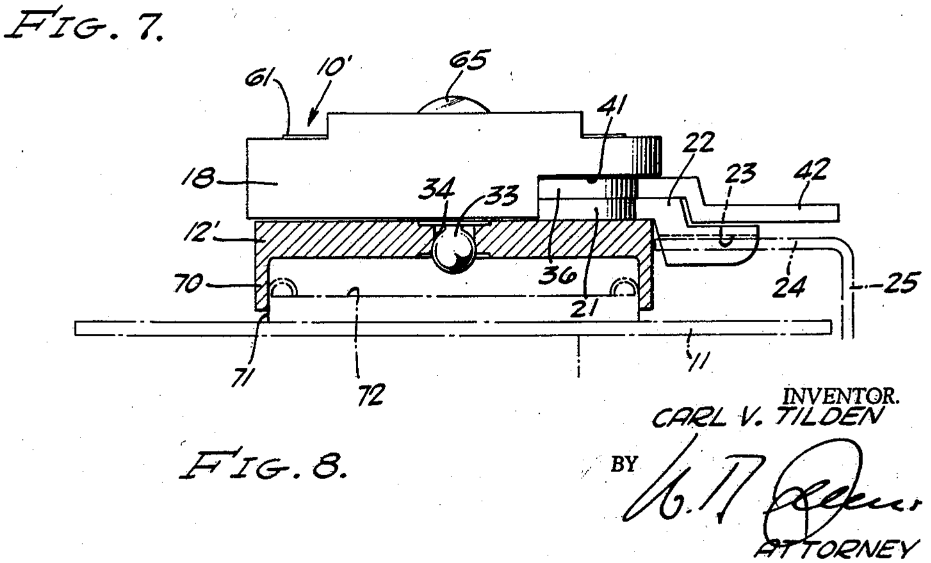
FIGURE 8 is a side elevational view of the accessory mounted on an alternate mounting base, the mounting base being shown in cross-section and the conventional elements of a dial ring being indicated in dot-and-dash line.

Referring now to FIGURE 8, there is shown a slightly modified embodiment of the dialing accessory which differs from the above described embodiment in the construction of mounting base 12'. Thus the downturned annular flange 70 of this alternate base 12' is so dimensioned as to have tight frictional engagement over the cylindrical rim face 71 of the usual boss 72 upstanding centrally from dialing ring 11. Base 12' may be formed of a tough high durometer plastic or of rubber having a high coefficient of friction and forming a snug, tight fit with dial boss 72. Since the second embodiment operates similarly to the first described form, it will be unnecessary to repeat the description of the mode of operation.

While the particular phone dial aid accessory herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A dialing aid accessory for use in conjunction with the dialing ring of a telephone, said accessory comprising a housing having means for supporting the same in close proximity to a phone dialing ring, stationary window means on said housing, rotary support means on said housing detachably seating on its upper surface a circular disc bearing the symbols of a subscriber's number arranged in order in an arc along the rim thereof and arranged for indexing past said window means thereby to expose the phone dialing symbols individually and sequentially, there being one symbol for each dialing operation required to complete a connection to the party being dialed, and indexing means operatively connected with said rotary support means and including means extending into the path of movement of the user's finger while operating the phone dial ring and operative by engagement with the finger as the dialing ring is rotated to rotate individual ones of said symbols to view sequentially in a predetermined order whereby the user is provided with dialing directions in individual steps.

2. A dialing accessory as defined in claim 1 characterized in that said disc is thin and in that said dialing accessory includes means for detachably mounting said disc in a predetermined position on said rotary disc supporting means.

3. A dialing accessory as defined in claim 2 characterized in that said disc means is provided with locator openings adapted to receive rigid registering projections carried by said rotary disc supporting means.

4. A self-contained dialing aid accessory for use with phone dialing mechanisms, said accessory comprising a housing having a base adapted to be mounted on and to rotate with a phone dial ring, anchor means pivoted on said base and having a stationary end adapted to be secured to a stationary portion of a phone set, means for detachably supporting means bearing separate instructions for each dial operation, and means including indexing means for exposing each of said dialing instructions within a viewing area sequentially as the user operates the dial to send a dialing signal to centrally located switching mechanism.

5. An accessory as defined in claim 4 characterized in the provision of lens means positioned at the viewing area for magnifying the instructions advanced thereto on each dialing operation.

6. An accessory as defined in claim 4 characterized in that said base is formed for location centrally within the confines of the annular row of finger openings of conventional phone dial rings and having means for securing the same against the top face of a phone dial, said anchor means having an arm projecting radially beyond said base and adapted to be detachably fixed to the usual finger stop of a phone dialing mechanism, said anchor means providing a stationary support for said indexing means.

7. An accessory as defined in claim 6 characterized in that said indexing means includes pivotable means normally biased clockwise but movable through a predetermined arc to transmit an indexing impulse to said indexing means to advance the latter by a single indexing step each time said dial ring is rotated to dial a symbol of a subscriber's number.

8. A dialing aid accessory for dial telephones comprising a self-contained assembly adapted to be supported concentrically of a phone dial, rotary means for detachably supporting a dial aid disc imprinted with a subscriber's number on said assembly, indexing means within said assembly for advancing said dial aid disc step by step past a viewing station to expose a different symbol of the subscriber's number for each step of advance of said indexing device, an actuator for said indexing device extending into the path of the means used to rotate the phone dial clockwise and operable to advance said indexing device through a single step each time the phone dial is rotated clockwise.

9. A dialing aid accessory as defined in claim 8 characterized in the provision of means for preventing retrogress rotary movement of said dial aid disc between individual dialing operations.

10. A dialing aid accessory as defined in claim 8 characterized in the provision of brake means for said indexing device operable to limit rotary movement of said aid disc to a single step of predetermined length upon each actuating operation.

11. A dialing aid accessory as defined in claim 8 characterized in the provision of lens means at said viewing station positioned to magnify the dialing aid symbols presented therebeneath as the indexing device is operated in dialing a subscriber's number.

12. A dialing aid accessory as defined in claim 8 characterized in that the supporting means for said dial aid disc includes projections cooperating with a similar number of similarly shaped passages in the aid disc and serving as locators for assuring the proper assembly of the disc to the accessory each time said aid disc is used.

13. A dialing aid accessory for dial telephones comprising a self-contained accessory having a base member adapted to be clamped to the center of a phone dial, movable means for detachably supporting a dial aid card for a particular phone number, indexing means operatively associated with said movable means for advancing said card by one element of the phone number carried thereon each time the dial is rotated, clutch means for holding the card against movement except when said dial is operated to dial an element of the party's number, and means holding said base member detachably assembled to the remainder of the accessory and for releasing the same upon the application of a predetermined separating pressure.

14. A dialing aid accessory as defined in claim 13 characterized in that said indexing means and the base therefor are circular and of a size such that the accessory lies within the circle formed by the inner edges of the finger holes in a phone dial whereby said device does not obstruct access to such finger holes.

15. A dial aid accessory adapted to receive and support selectively any one of a plurality of carrier discs each bearing in order symbols required to be dialed to complete connections to a particular subscriber, said accessory comprising an indexing mechanism having a rotatable mounting plate adapted to support detachably a selected carrier disc having arranged counterclockwise along the rim thereof the symbols of a particular subscriber number, means for mounting said accessory adjacent the dial of a phone set, indexing means operatively associated with said carrier mounting plate and including an arm adapted to be contacted by the user's finger in dialing a symbol of a subscriber's number and to be actuated through a constant arc in a clockwise direction each time the phone dial is operated to dial a symbol of a subscriber's number whereby a different one of the symbols appearing on said carrier disc is advanced individually and sequentially into registry with a viewing window provided in said accessory.

16. A dial aid accessory as defined in claim 15 characterized in the provision of spring means opposing the rotary advance of said plate for the carrier disc and for returning the indexing means to the same starting position following each dialing operation.

17. A dial aid accessory as defined in claim 16 characterized in the provision of resilient one-way clutch means operable to release said plate for advance movement but instantly operable to prevent retrograde rotary movement of said plate.

18. A telephone number carrier adapted to be temporarily mounted in a predetermined position on a telephone dialing accessory operatively associated with a telephone dialing ring while the user dials a particular subscriber, said number carrier comprising a thin disc having mounting and locator means thereon adapted to register and interfit with complementally shaped means carried by a telephone dialing accessory of the type having indexing means for indexing said disc in the same direction through similar steps about the center of said disc during each dialing operation of a telephone dialing ring, said carrier disc having arranged in normal sequential order circumferentially of the rim thereof individual ones of the symbols for each dialing operation required in dialing a particular party, whereby each indexing movement of the number carrier disc indexes a different one of said symbols into the same viewing position, the space for one of said symbols including means giving said space a distinctive appearance rendering the same easily distinguishable from the other symbol spaces to aid the user in locating the carrier disc quickly and accurately in a desired position in the mounting space of a dial aid accessory each time it is resired to dial the party whose number appears on said carrier, said carrier disc being circular and said locator means comprising a ring of perforations corresponding in number to the number of symbol spaces, said perforations being concentric with the center of said disc and adapted to be seated selectively in different positions over the ends of a ring of appropriately disposed complementally-shaped locator means in the mounting space of a dial aid accessory.

References Cited in the file of this patent

UNITED STATES PATENTS

| | | |
|---|---|---|
| 1,508,434 | Ayres | Sept. 16, 1924 |
| 2,072,657 | Varley | Mar. 2, 1937 |
| 2,390,357 | Disken | Dec. 4, 1945 |
| 2,511,334 | Gruber | June 13, 1950 |

FOREIGN PATENTS

| | | |
|---|---|---|
| 253,129 | Switzerland | Nov. 1, 1948 |